United States Patent [19]

Rumer

[11] Patent Number: 5,181,697
[45] Date of Patent: Jan. 26, 1993

[54] IMPACT MEMBER WITH MULTIPLE CONCENTRIC GAS CUSHIONS INFLATED IN SEQUENCE

[75] Inventor: Klaus Rumer, Heitersheim, Fed. Rep. of Germany

[73] Assignee: Diehl GmbH & Co., Nuermberg, Fed. Rep. of Germany

[21] Appl. No.: 681,952

[22] Filed: Apr. 8, 1991

[30] Foreign Application Priority Data

Apr. 30, 1990 [DE] Fed. Rep. of Germany ....... 4013868

[51] Int. Cl.[5] .......................... F16F 9/04; B60R 19/20; B60R 21/24; B66B 5/28
[52] U.S. Cl. ................................ 267/116; 267/64.27; 267/64.28; 267/139; 280/729; 293/133; 293/110
[58] Field of Search .................... 267/64.27, 64.28, 35, 267/116, 117, 120, 122, 139, 142; 5/455, 453; 248/548, 550, 573, 576; 280/729; 293/133, 110, 107, 120, 2; 188/371, 376

[56] References Cited

U.S. PATENT DOCUMENTS

| | | | |
|---|---|---|---|
| 2,712,913 | 7/1955 | Stanley | 293/107 X |
| 2,713,466 | 7/1955 | Fletcher et al. | 293/107 X |
| 3,586,347 | 6/1971 | Carey | 280/729 |
| 3,664,653 | 5/1972 | Walker | 267/139 |
| 3,900,210 | 8/1975 | Lohr et al. | 280/729 |
| 4,136,894 | 1/1979 | Ono et al. | 280/729 |
| 4,176,858 | 12/1979 | Kornhauser | 293/107 X |
| 4,198,075 | 4/1980 | Kob et al. | 280/753 |
| 4,744,300 | 5/1988 | Bugiel | 102/291 |
| 4,948,168 | 8/1990 | Adomeit et al. | 280/732 |

FOREIGN PATENT DOCUMENTS

| | | |
|---|---|---|
| 2021475 | 11/1971 | Fed. Rep. of Germany. |
| 3913034 | 2/1989 | Fed. Rep. of Germany. |
| 3743840 | 6/1989 | Fed. Rep. of Germany. |
| 3829368 | 3/1990 | Fed. Rep. of Germany. |
| 3829617 | 3/1990 | Fed. Rep. of Germany. |
| 3833888 | 4/1990 | Fed. Rep. of Germany ...... 280/729 |

OTHER PUBLICATIONS

ADAV Moatorwelt, (Jul. 1989), p. 8.
Bergau, (Aug. 1978), pp. 388 and 389.

Primary Examiner—Robert J. Oberleitner
Assistant Examiner—Josie A. Ballato
Attorney, Agent, or Firm—Scully, Scott, Murphy & Presser

[57] ABSTRACT

An impact or recoil member possessing a plurality of gas cushions which are arranged within each other, and which are activatable in sequence in response to a triggering sensor. A comparatively hard assumption of a load by the outer gas cushion is permitted up to a pressure rise beyond its bursting limit; with at least one inner gas cushion which is designed for the assumption of the residual energy of the mass which is to be caught under a hard or stiff spring characteristic. The individual gas cushions are activated staggered in time from the outside towards the inside over a period of time from a triggering apparatus which is centrally provided for all gas cushions either in or behind the mounting support for the inflation of the still folded-in cushion casings in a specified time sequence, whereby the actuation of the triggering apparatus is implemented through the triggering or tripping sensor which is correlated with the loading scenario.

4 Claims, 2 Drawing Sheets

IMPACT MEMBER WITH MULTIPLE CONCENTRIC GAS CUSHIONS INFLATED IN SEQUENCE

BACKGROUND OF THE INVENTION

1. Field of the Invention

The present invention relates to an impact or recoil member possessing a plurality of gas cushions which are arranged within each other, and which are activatable in sequence in response to a triggering sensor.

2. Discussion of the Prior Art

An impact member which is to be mounted ahead of the front axle of a truck as a honeycombed-like protection against being able to drive beneath the truck has become known from the disclosure of ADAC motorwelt, Vol. 7/1989, page 8. Behind a covering of plastic material, the resilient sheet metal-honeycomb construction possesses forwardly oriented rod-shaped polyhedra which as a consequence of their deformation, are intended to act shock-absorbingly with regard to an impacting mass. However, in constructions of that type, the high manufacturing requirements and the comparatively extraordinary large need for installation space are disadvantageous; moreover, also the dangers caused by the impact mass towards the end surface subsequent to the splintering apart of the plastic covering in front of the cutting edge-like surface edges of the polyhedron-honeycombs.

For passenger vehicles in the higher comfort or luxury classes, there are employed inherently stable bumpers in front of shock-absorber elements, which through their internal resiliency (in rubber-like blocks) or through their work in the displacement thereof (for piston-fluid systems) are designed to absorb and dissipate the impacting energy of a striking or impact mass. Impact or recoil cup systems (such as generally spring-rubber combinations) act in a similar manner as safety systems against crash impacts in elevator shaft structures or cableway installations.

Basically, other operating criteria must be met through air bag-safety devices for vehicle passengers. In this instance, the head and possibly also the upper torso should thereby be protected by a rapid deceleration or braking caused by an accident before striking against a structural component located in front of the person, in that a crash-sensor activates a gas generator for the inflation of a gas cushion, which then allows the striking person to sink in softly, due to a discharge of gas (through the porous casing construction or through outlet valves), and immediately thereafter collapses into itself so as to thereafter no longer obstruct the driver of the vehicle. Thereby, as disclosed in German Laid-Open Patent Appln. 38 29 368, in the interior of a gas cushion there can be arranged a further, much smaller gas cushion which remains inflated subsequent to the collapse of the large outer cushion, so as to afford again in the case of a follow-up impact, a cushioning of the body without thereby representing any impermissible obstruction.

From the disclosure of German Laid-Open Patent Appln. 38 29 617 it has become known to expand a large gas cushion by means of a limited gas volume in that it is not the entire interior space of the cushion which is inflated, but rather only the small space between a double-walled cushion casing.

Completely different from the case of such passive protection for vehicle passengers are the demands on a shock-dissipating impact member of the type under consideration herein, particularly inasmuch as, in this instance, it does not pertain to short-term soft cushioning and the immediately again thereafter effected freeing of a back-and-forth swinging body movement, but rather relates to the absorption and braking conversion of the motional energy of a striking mass possessing a high kinetic energy without the need of having to stop an excessively high shock load.

SUMMARY OF THE INVENTION

Accordingly, in recognition of these conditions, it is an object of the present invention to provide an impact member of the type being considered herein which, notwithstanding a small installation volume, will absorb a hard shock caused by a load in a constructively-influenceable kinetic, and is able to attenuate the shock up to a relative resting position of the impact or striking mass with regard to the support for the impact member.

The foregoing object is inventively achieved in that the impact member of the type considered herein is designed in a manner whereby it incorporates a plurality of gas cushions which are arranged within each other, and which are activatable in sequence through the intermediary of a triggering or tripping sensor.

The foregoing object is predicated on the consideration that, in contrast with passenger protective systems, it is of the greatest importance for impact members for the braking of impacting masses, that the kinetic energy thereof be absorbed without any extensive recoil or spring-back effects, which can be implemented in the simplest manner in that a comparatively hard assumption of a load by the gas cushion is permitted up to a pressure rise beyond its bursting limit; with at least one subsequent gas cushion which is designed for the assumption of the residual energy of the mass which is to be caught under a hard or stiff spring characteristic. For large masses which must be brought to a standstill from a high rate of speed within extremely short distances, such as in the case of safety devices for elevators or cableway installations, there is arranged between the outer bursting gas cushion and the innermost non-bursting gas cushion at least one further gas cushion which in the instance of a non-bursting design is provided with an internal support through the gas cushion which is located rearwardly thereof. The individual gas cushions are expediently activated staggered in time from the outside towards the inside over a period of time from a triggering apparatus which is centrally provided for all gas cushions either in or behind the mounting support for the inflation of the still folded-in cushion casings in a specified timed sequence, whereby the actuation of the triggering apparatus is implemented through a triggering or tripping sensor which is correlated with the loading scenario. The tripping sensor can be a sensor which is responsive to extreme positive or negative decelerations or braking, and which is arranged on the installation support for the impact member and/or on the mass which is to be caught relative thereto. For railway installations (whether they are designed to be bound to rails, inclined cableways or as vertical lifts), the tripping sensor is arranged in the region of the guidance behind the last station so as to only respond to an irregular traveling mode beyond the last station. This sensor or an additional tripping sensor; however, can also be installed in the driving mechanism for the cabin; and for example, can respond through the intermediary of a traction current or speed detector to an irregular operating condition, which would otherwise lead to a hard impact against the rail bumper stops.

DETAILED DESCRIPTION

Figure 1:
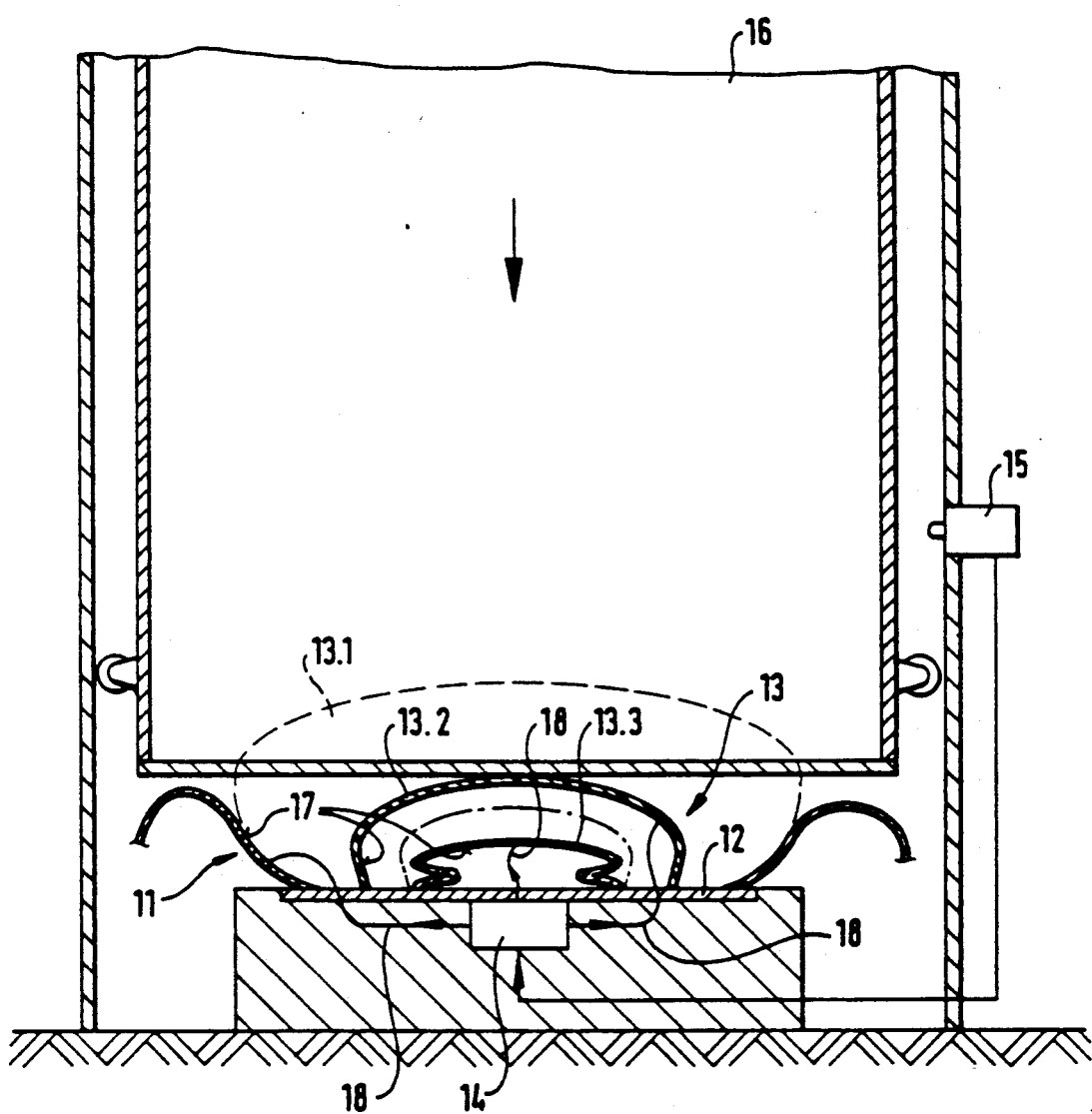
FIG. 1 illustrates a sectional view showing the manner of operation of the invention as a shock absorber at the base of an elevator shaft.
Figure 2:
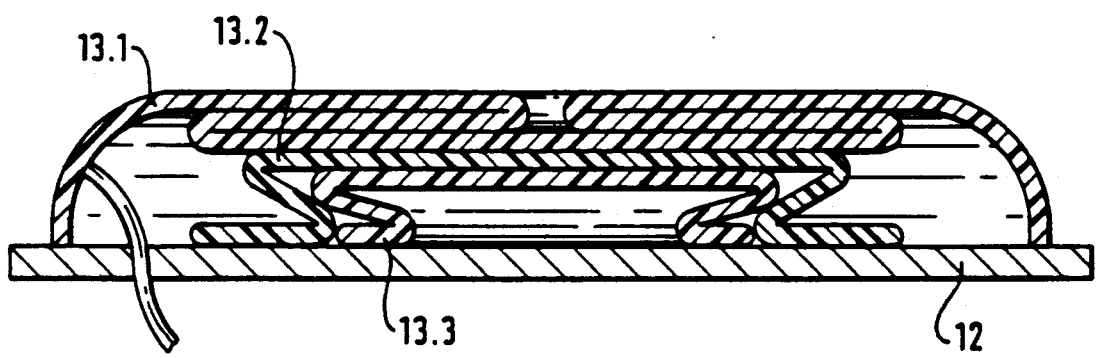
FIG. 2 represents a plurality of gas cushions stacked one within another.

The impact member 11, which is illustrated herein in section in FIG. 1, possesses a plurality, in this instance, three gas cushions 13 which are arranged within each other and located on a common mounting support 12, including a triggering apparatus 14 which is common to these gas cushions and is operative—through ignition lines or cords 18 extending in the direction of the illustrated arrows which can be activated by a tripping sensor 15, in order to initiate the inflating of the gas cushion 13 in timed sequence such that the outer gas cushion 13.1 is impact-filled ahead of or the middle gas cushion 13.2 and the innermost gas cushion 13.3 subsequent to the last-mentioned gas cushion 13.2. As a result, there can be obtained in front of the support 12 an eccentric arrangement of a plurality of filled gas cushions 13 which are arranged within each other, as is illustrated in the drawing through phantom and dash-dotted lines. Nevertheless, the mechanical and kinematic design of the gas cushions 13 which are stacked within each other (as shown in FIG. 2) is selected in such a manner that, at the operational readiness of the impact member 11 for the dissipation of the shock loading from an impacting mass 16 (shown in the drawing as an elevator cage which contrary to normal operation falls through and thereby in the guidance structure activating the sensor 15), the outer gas cushion 13.1 is imparted shock-absorbant excess-pressure dissipation (due to the porosity of its fabric and/or through an outlet valve, not shown; as well as through the only comparatively slowly increasing reaction force of the middle gas cushion 13.2 which inflates at a display in time). Through the loading by means of the impact mass 16 there is finally exceeded the constructively specified (by means of tear seams or pressure relief valves) bursting pressure immediately after the fully expanded formation of the middle gas cushion 13.2. As is illustrated, this smaller middle gas cushion 13.2 then assumes the further energy dissipation from the already previously braked-down mass 16. Also the last one of a plurality of middle gas cushions 13.2 can be loaded up to bursting. This is because the innermost gas cushion 13.3, with regard to its stability and its inflation kinematic relative to the expected shock loadings from the impact member 11, is constructed the most stable or rugged and with the lowest degree of yeildability (elasticity) such that, independently of the continuance or the bursting of the last middle gas cushion 13.2, the impacting mass 16 will come to rest on the still slightly resilient final gas cushion 13.3.

Figure 3:
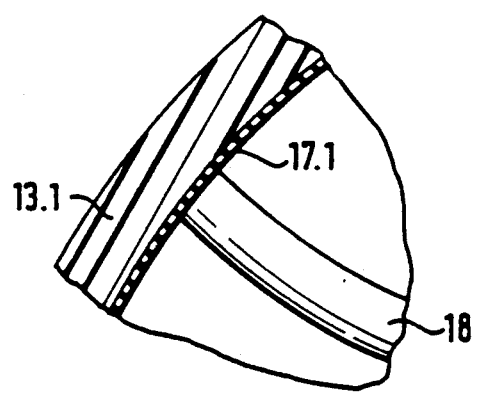
FIG. 3 represents one alternative embodiment of a coating of reaction-active material on the insides of individual gas cushion-casings.
Figure 4:
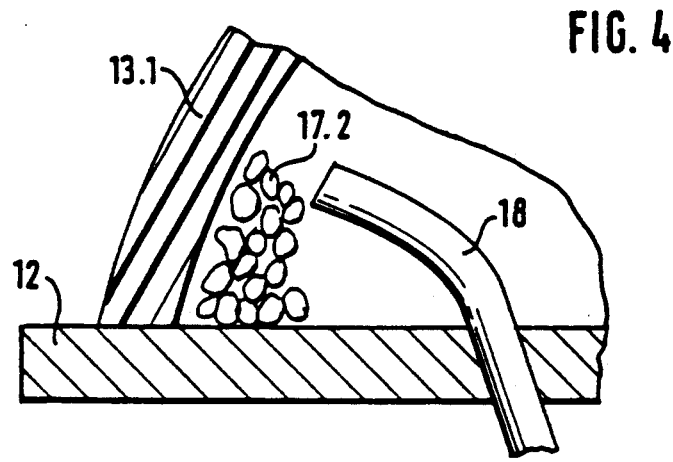
FIG. 4 represents another alternative embodiment of a gas-forming granulate lining the insides of individual gas cushion-casings.

For the inflating of the gas cushions 13, expediently there are not employed any usual central or grouped gas cartridges, but for each of the gas cushions 13 an initiatable gas generating device 17 in the shape of a gas-forming granulate 17.2 (see FIG. 4); or as known as such from the disclosure of German Laid-Open Patent Appln. OS 39 13 034 as represented in FIG. 3; in effect, as a coating 17.1 on the insides of the individual gas cushion-casings with a reaction-active material, whose conversion with admixed reaction partners releases extremely rapidly the most energy-rich reaction gases for the almost incompressible rapid inflation of the individual gas cushions 13. Hereby, it is of advantage that the more reaction coatings can be provided, the larger there is dimensioned the extended gas cushion 13, the larger is its inner casing surface; with a propagating reaction from the triggering location across the inner surface during the course of the growth in the requirement for filling gas during the expansion of the gas cushion-casing which is initially folded into the narrowest readiness space. Hereby, the reaction material can be optimized which respect to the gas cushion-expansion kinetics, inasmuch as a compatibility with persons of the gas which is released from the cushion 13, otherwise than for passenger vehicle-restraint systems, due to the employment of the inventive impact member 11, is not a required design criterium. Consequently, suitable as a gas-forming substance in the interior of the still folded cushion casings; especially on their internal jacket surfaces, is especially that as also described in Bugiel U.S. Pat. No. 4,744,300, commonly assigned to the present assignee, for a completely different purpose (acceleration of a mass opposite the damping effect of an incompressible surround in fluid) in the highly-agile sodium borohydride or sodium baranate, upon an electrochemical release of an admixed acidic reaction partner.

Created thereby is not only a highly-effective but also only flatly-constructed impact member, from which there is not encountered any danger of injuries for the mass which is to be braked, and which subsequent to an emergency response and use, is easily exchangeable with a functionally ready new exemplar thereof.

What is claimed is:

1. Impact member comprising at least two gas cushions which are arranged with in each other so as to constitute an outer cushion and at least one inner cushion; a triggering sensor for sequentially inflating said gas cushions, said at least two gas cushions jointly including a single time-delay triggering device which is connected to an output of said triggering sensor; a single mounting support on which said gas cushion are concentrically arranged in a flat folder arrangement within each other, said outer gas cushion being activated for inflation thereof prior to the inflation of said at least one inner gas cushion which is arranged therein.

2. Impact member as claimed in claim 1, wherein each of said gas cushions includes an electrically activatable gas-generating device in the configuration of a reaction gas-delivering substance within a casing of each of said gas cushions, said substance being applied as a coating on an internal surface of said casing.

3. Impact member as claimed in claim 1, wherein at least the outer gas cushion is designed to burst responsive to the reaching of a specified pressure within said outer cushion which exceeds the rupture strength thereof.

4. Impact member as claimed in claim 1, wherein an innermost gas cushion of said at least two cushions is designed such that a gas filling contained therein is slowly discharged responsive to an external loading without bursting said innermost gas cushion.

* * * * *